Aug. 1, 1939.   R. E. CRAMER   2,167,877
ELECTRICAL CONDENSER CONSTRUCTION
Filed Nov. 26, 1935
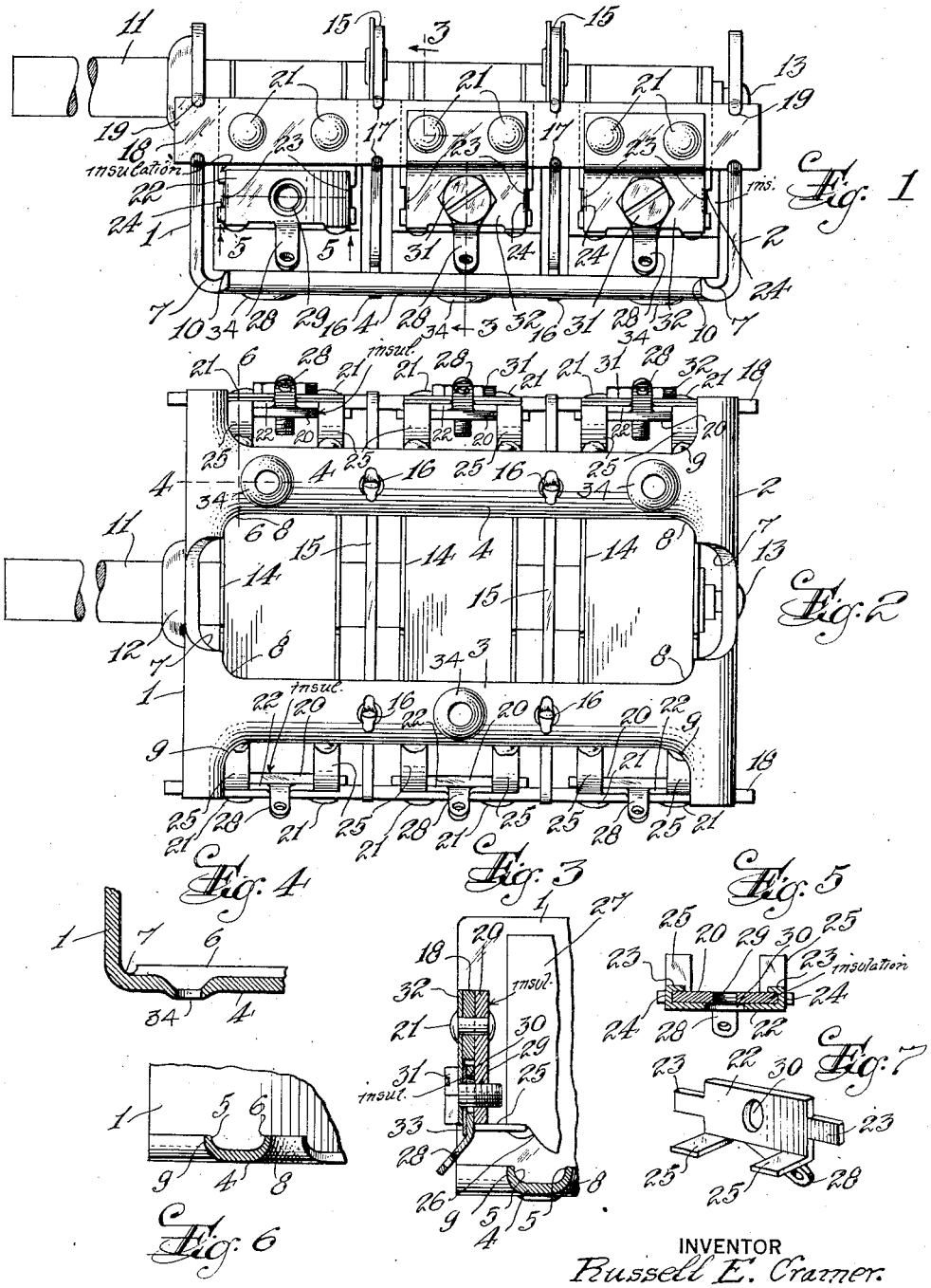
INVENTOR
Russell E. Cramer.
BY
A. D. T. Libby
ATTORNEY Patented Aug. 1, 1939

2,167,877

UNITED STATES PATENT OFFICE 2,167,877

ELECTRICAL CONDENSER CONSTRUCTION

Russell E. Cramer, Audubon, N. J., assignor to Radio Condenser Company, Camden, N. J.

Application November 26, 1935, Serial No. 51,591

6 Claims. (Cl. 175—41.5)

This invention relates to the general construction of an electrical condenser such as is used in tunable circuits in radio receiving sets, and has to do with improvements in various details entering into the construction and operation of the condenser.

It is one of the objects of my invention to provide an improved form of frame which supports the stator and rotor groups of plates.

Another object of my invention is to provide a simpler, cheaper and improved form of attachment of the stator group of plates to the frame.

A still further object of my invention is to provide an improved method of attaching a trimmer plate to the condenser unit.

These and other objects will be clear to one skilled in this art, on reading the attached specification, taken in connection with the drawing, wherein:

Figure 1 is a side elevation, on an enlarged scale, of a three-gang condenser embodying my improvements, the trimmer plate being removed.

Figure 2 is a bottom view of the gang condenser shown in Figure 1.

Figure 3 is a section on the line 3—3 of Figure 1.
Figure 4 is a section on the line 4—4 of Figure 2.
Figure 5 is a section on the line 5—5 of Figure 1.
Figure 6 is a section on the line 6—6 of Figure 2.

Figure 7 is a perspective view of the terminal strip used for supporting the stator group of plates to the insulator carried by the frame.

In the various views, all of which are on an enlarged scale, wherein like numbers refer to corresponding parts, the frame of the gang condenser includes two end plates 1 and 2 which are preferably punched integral with the cross bars 3 and 4, and then bent or formed in a peculiar manner as shown in Figures 1, 2, 3, 4 and 6. As shown in these figures, the bottom cross bars 3 and 4 have their sides 5 and 6 formed so as to provide a channel-shaped bar, and at the points 7, closely adjacent the plane of the end plates 1 and 2, the metal of the frame is curved as indicated by the lines 8 and 9, so that the channel edges 5 and 6 of the bars 3 and 4 are continued into the upturned edges 10, thereby providing a tremendous stiffening means closely adjacent the line of bend of the end plates 1 and 2.

I have found that this construction gives a frame which is very much stiffer than a frame in which the end plates 1 and 2 are made separate from the bottom and sides and riveted thereto as shown in S. S. Cramer Patent 1,800,719, issued April 14, 1931; or much stiffer than a frame in which the end plates are integral with the bottom portion and bent upwardly therefrom. By cutting out the greater part of the bottom of the condenser, leaving only the channel members 3 and 4, the minimum capacity of the condenser is lowered and the entire frame structure is materially lightened, yet great rigidity is obtained by forming the channel members 3 and 4 and the end plates 1 and 2 as described.

As shown in Figures 1 and 2, the end plates 1 and 2 carry a rotor shaft 11 which is supported therein in any satisfactory manner as by the use of an anti-friction bearing 12 in the end plate 1, and a ball-thrust bearing 13 in the end plate 2.

In the drawing, no attempt has been made to show all of the individual plates comprising the rotors and stators of the various units. However, one rotor plate 14 for each rotor group is indicated. Between each condenser group, there is positioned a shield and brace plate 15, the same being riveted as at 16 to the channel members 3 and 4, and also swedged at 17 to the cross metal frame member 18 which is also riveted or swedged at 19 to the end plates 1 and 2.

The stator group of plates for each unit is carried by insulators 20 fastened to the frame bar 18 in any satisfactory manner as by rivets 21. Each insulator 20 extends downwardly a considerable distance below the frame member 18, and on the lower end thereof is mounted a terminal strip 22 which is provided with lugs 23 adapted to be positioned in slots 24 on opposite sides of the insulator 20, the lugs 23 being bent over the rear face of the insulator, thereby locking the terminal strip 22 in position on the insulator. The terminal strip 22 has fingers 25 extending inwardly toward the shaft 11 into close proximity with the tie bar 26, to which the stator plates 27 are connected. The union between the fingers 25 and the tie bar 26 is made by soldering, as disclosed in Russell E. Cramer application Serial No. 717,860, filed March 28, 1934. The terminal 22 also has a projecting lug 28 to which the connecting wire is fastened in any satisfactory manner, as by soldering.

The insulator 20 has a tapped hole 29, considerably smaller in diameter than the hole 30 in the terminal 22, to receive an adjusting screw 31 used for adjusting a trimmer plate 32 which is fastened directly to the metal frame bar 18 by the rivets 21. It will be noted from the section in Figure 3, that an insulator, such as a piece of mica 33, is positioned between the lower portion of the trimmer plate 32 and the face of the terminal plate 22 to prevent the screw 31 from forcing the plate 32 into contact with the terminal strip 22, and thereby prevents short-circuiting of the condenser unit.

This method of mounting the trimmer plate places the trimmer plate at ground potential, thereby eliminating the necessity of extending the shield plates 15 beyond the opposite sides of the frame, as has been done in the past, to prevent interaction between the various units, due to the closely mounted trimmer plates. This construction also eliminates the use of a Bakelite bushing which must be used in connection with the adjusting screw when the trimmer plates are mounted in the usual way, as generally set forth in Patent 1,800,719 heretofore referred to.

It may be mentioned in passing that the cross frame members 3 and 4 are provided with bosses 34 formed by forcing the metal outwardly as shown in Figure 1, and these bosses may be tapped to receive screws for holding the condenser on a suitable mounting plate.

The construction heretofore described provides a very rigid and non-warping frame, even though the same is made very light by punching out a large portion of the central part thereof. By bending over the edges of the cross frame members 3 and 4 to form a channel, and continuing these bent-over edges into the flared form at 8 and 9, as has been described, while the end plates 1 and 2 are being formed into position, provides an extremely rigid frame, and this rigidity aids in maintaining the spaced relation between the rotor and stator plates after they have been assembled, as defined in the Russell E. Cramer application previously referred to.

What I claim is:

1. For a variable electrical condenser having a rotor with shaft, and stator plates; a non-warping frame comprising a stamping having an integral upturned plate at each end providing bearing supports for the rotor shaft and a plurality of spaced bottom cross members having their edges formed over to provide a frame member having a cross section similar to a channel, the material at the opposite ends of said channel-shaped member, closely adjacent the end plates, being flared away from the member and these flared portions turned inwardly toward their respective end plates, and a frame bar on each side of the condenser extending between the end plates and anchored thereto, and acting at least in part as a support for the stator plates.

2. For a variable electrical condenser having a rotor with shaft, and stator plates; a non-warping frame comprising a stamping having a large part of the central portion entirely removed leaving on opposite sides thereof frame members with end portions extending therefrom, said frame members having their edges turned inwardly to form channels which terminate in flared ribbed portions closely adjacent said end portions, said end portions having a bend closely adjacent said flared portions in the same direction to form end plate supports for the rotor shaft, and a frame bar on each side of the condenser extending between the end plates and anchored thereto, and acting at least in part as a support for the stator plates.

3. In an electrical condenser having a frame, rotor and stator plates, the latter of which are fastened to tie bars for attachment to insulators carried by metallic bar frame members on opposite sides thereof and spaced from the bottom of the frame; said attachment comprising a terminal plate lying across the outer face of each insulator below said bar frame members said plate having lugs clinched around parts of the insulator and also having fingers extending inwardly toward the stator tiebars for attachment thereto, and a further part to which a conductor may be attached, said insulator and terminal plate having holes concentrically arranged but the hole in the terminal plate being materially larger in diameter than the hole in the insulator, the latter hole being tapped, a trimmer plate fastened directly to said bar member and extending downwardly over said terminal plate but prevented from contacting therewith by an insulator, and an adjusting screw passing through the trimmer plate and into the tapped hole in the stator support insulator.

4. In an electrical condenser having a frame, rotor and stator plates, the latter of which are fastened to tie bars for attachment to insulators carried by metallic bar frame members on opposite sides thereof and spaced from the bottom of the frame; said attachment comprising a terminal plate fastened to the lower portion of each insulator, and a trimmer plate fastened on at least one side of the condenser directly to the frame bar on that side and extending downwardly over said terminal plate, with means for adjusting its relation thereto, and an insulator positioned between the terminal plate and the trimmer plate, the terminal plate having fingers to which the stator tiebars are fastened, and means for making connection to the terminal plate.

5. In an electrical condenser having a frame, rotor and stator plates, the latter of which are fastened to tie bars for attachment to insulators carried by metallic bar frame members on opposite sides thereof; said attachment comprising a terminal plate lying across the outer face of each insulator and spaced from said bar frame members, said plate having lugs clinched around parts of the insulator and also having fingers extending inwardly toward the stator tie bars for attachment thereto, and a further part to which a conductor may be attached, said insulator and terminal plate having holes concentrically arranged but the hole in the terminal plate being materially larger in diameter than the hole in the insulator, the latter hole being tapped, a trimmer plate fastened directly to said bar member and extending over said terminal plate, and an adjusting screw passing through the trimmer plate and into the tapped hole in the stator support insulator.

6. In an electrical condenser having a frame, rotor and stator plates, the latter of which are fastened to tie bars for attachment to insulators carried by metallic bar frame members on opposite sides thereof; said attachment comprising a terminal plate fastened to a portion of each insulator and a trimmer plate fastened on at least one side of the condenser directly to the frame bar on that side and extending over said terminal plate, with means for adjusting its relation thereto, the terminal plate having fingers to which the stator tie bars are fastened, and means for making connection to the terminal plate.

RUSSELL E. CRAMER.